(12) United States Patent
Brandsberg-Dahl et al.

(10) Patent No.: US 7,952,960 B2
(45) Date of Patent: May 31, 2011

(54) SEISMIC IMAGING WITH NATURAL GREEN'S FUNCTIONS DERIVED FROM VSP DATA

(75) Inventors: Sverre Brandsberg-Dahl, Houston, TX (US); Brian E. Hornby, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 671 days.

(21) Appl. No.: 11/866,862

(22) Filed: Oct. 3, 2007

(65) Prior Publication Data

US 2008/0130411 A1 Jun. 5, 2008

Related U.S. Application Data

(60) Provisional application No. 60/849,079, filed on Oct. 3, 2006.

(51) Int. Cl.
*G01V 1/00* (2006.01)
(52) U.S. Cl. .......................................... 367/38; 367/57
(58) Field of Classification Search .................... 367/57, 367/38; 702/6, 18
See application file for complete search history.

(56) References Cited

U.S. PATENT DOCUMENTS

| | | | |
|---|---|---|---|
| 5,696,735 A | 12/1997 | Krebs | |
| 5,742,560 A * | 4/1998 | Krebs | 367/57 |
| 6,002,642 A | 12/1999 | Krebs | |
| 7,376,539 B2 * | 5/2008 | Lecomte | 703/1 |
| 7,508,733 B2 | 3/2009 | Haldorsen | |
| 2009/0043545 A1 * | 2/2009 | van Manen et al. | 703/2 |
| 2009/0323471 A1 * | 12/2009 | Wang | 367/27 |

OTHER PUBLICATIONS

Brandsberg-Dahl, et al., "Migration of Surface Seismic Data With VST Green's Function", Jun. 2007, Publisher: The Leading Edge, Published in: US.
Brands-Berg Dahl, et al., "Surface Seismic Imaging With VSP Green's Functions", Jun. 11, 2007, Publisher: Eage 69th Conference, Published in: GB.
Krebs, et al., "Accurate Migration Using Offset-Checkshot Surveys", 1995, pp. 1186-1188, Publisher: Ann. Internat. Mtg. Soc. Expl. Geophys., Expanded Abstracts, Published in: US.
Schuster, Gerard T., "Reverse-Time Migration = Generalized Diffraction Stack Migration", Oct. 6, 2002, Publisher: SEG Int'l Exposition and 72nd Annual Meeting, Published in: US.

* cited by examiner

*Primary Examiner* — Mark Hellner
(74) *Attorney, Agent, or Firm* — Albert K. Shung

(57) ABSTRACT

The methods described herein are conceptually similar to classical migration/imaging for surface seismic data. However, instead of using computed (estimated) Green's functions in the imaging process, the instant invention utilizes measured (near-exact) Green's functions from VSP data to image the surface seismic data. Although the instant invention is best utilized where the velocity profile is approximately 1D (i.e., v(z)), the methods disclosed herein can also be extended to instances where there are some lateral velocity variations. Under these conditions, the instant invention allows for imaging surface seismic data and 'self-imaging' VSP data without first having to estimate a velocity model. The measurements obtained from the VSP data can also be used as a tool for calibrating computed Green's functions and migration operators.

14 Claims, 3 Drawing Sheets

SEISMIC IMAGING WITH NATURAL GREEN'S FUNCTIONS DERIVED FROM VSP DATA

RELATED CASES

This application claims the benefit of U.S. Provisional Patent Application Ser. No. 60/849,079 filed on Oct. 3, 2006, and incorporates said provisional application by reference into this disclosure as if fully set out at this point.

TECHNICAL FIELD

This invention relates to the general subject of geophysical exploration for hydrocarbons and, in particular, to methods for collecting and analyzing seismic data in which at least one seismic receiver is positioned beneath the earth's surface.

BACKGROUND OF THE INVENTION

A seismic survey represents an attempt to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A conventional seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface.

Many variations of the conventional source-receiver arrangement are used in practice, e.g. VSP (vertical seismic profile) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

Of particular interest for purposes of the instant application are seismic exploration techniques such as VSPs or similar technology. By way of general background, a VSP survey is an exploration technique in which a seismic signal is generated at or near the surface and subsequently sensed by one or more geophones (land seismic sensors) or hydrophones (marine seismic sensors) that are situated in the subsurface, e.g., within a cased or uncased well which may or may not have been drilled for that purpose.

VSP seismic data are often used to support and clarify the subsurface interpretation obtained from other seismic data sources (e.g., conventional surface seismic, well logs, cores, etc.). Because the VSP receivers are situated in the subsurface they potentially yield unique information about the up going and down going seismic energy and, since they are located much nearer to the subsurface target(s) of interest (and, in more particular, are located below the surface weathering layer) than surface receivers, there is an expectation that the data collected thereby will be yield a more representative image of the subsurface.

Related in general concept to the VSP survey is a checkshot survey, which also utilized a surface source and downhole receivers (e.g., seismic receivers that are positioned within a producing well, a well that is being drilled, a well that was created for purposes of seismic imaging, etc.). However, the checkshot survey is directed not so much toward imaging the subsurface, but rather toward development of a velocity profile in the rocks near the well. One difference between a VSP survey and a checkshot survey is that in a checkshot survey attention is typically directed only toward the first breaks (earliest arrivals) of the seismic energy from the source, whereas in a VSP survey it is the seismic energy that is sensed following the first break that is most useful for purposes of seismic imaging. Of course, those of ordinary skill in the art will understand that a VSP survey also yields a checkshot survey, but not vice versa. Finally, the various methods of collecting and processing VSP and checkshot data to make them useful in seismic exploration are well known to those of ordinary skill in the art and, as such, will not be covered herein.

One persistent problem that tends to limit the effectiveness of seismic in some locations is the challenge of obtaining good images near complex structures such as salt domes. In such cases, it is customary to apply imaging processes such as migration to the seismic data to relocate the observed reflectors in time and/or space, thereby causing them to more accurately represent the actual subsurface structural configuration. However, the ability to perform accurate time or depth migrations depends heavily on having knowledge of the subsurface rock properties (including, the velocity at every subsurface point), which information may be imperfect or lacking. In such cases, it is customary to estimate (e.g., from velocity spectra) the velocities using seismic data or, where it is available, well logs, etc.

More generally, seismic migration is the process by which wavefields recorded on or near the surface are mapped back into the sub-surface to form an image of the sub-surface geology (structure). Common to modern migration methods is that they typically rely on a computational model for the subsurface, so that approximate Green's functions can be constructed between all surface (recording) locations and all image points in the sub-surface. Those of ordinary skill in the art will recognize that the accuracy and complexity of this computational model will determine the image fidelity it is possible to achieve. Most state-of-the-art migration methods use Green's functions that include multiple arrivals and some finite-frequency effects, allowing them to image fairly complex geological structures. However, the computational model is in most cases only represented as a scalar wave speed (velocity) with smooth spatial variations. Some models will also include certain discontinuities in the velocity in an effort to represent geological boundaries that separate regions with different velocity. Whatever the model is, it has to be derived from measurements, and it will at best be a non-unique solution to an inverse problem. Commonly, much more crude approximations are used, say, that only try to match the predicted first-arrivals to the observed first arrivals in the data.

What is needed, then, is a method of calculating Green's functions for use in seismic imaging that does not suffer from the disadvantages of the prior art. Additionally, the method should provide for true amplitude (or near true amplitude) processing.

Heretofore, as is well known in the geophysical prospecting and interpretation arts, there has been a need for a method of using seismic data to obtain image of the subsurface that does not suffer from the limitations of the prior art. Accordingly, it should now be recognized, as was recognized by the present inventors, that there exists, and has existed for some time, a very real need for a method of geophysical prospecting that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for the imaging and monitoring of subsurface hydrocarbon reservoirs and other subsurface features which utilizes Green's functions that have been obtained from VSP or similar seismic survey data. In the preferred embodiment, a VSP survey will be conducted in the vicinity of an exploration target of interest. Additionally, a conventional 2D or 3D seismic survey will be conducted in the vicinity of the VSP. Data from the VSP will then be used to calculate a Green's function that, in turn, will be utilized in seismic migration of the surface seismic survey.

In another preferred embodiment, the calculated Green's function will be used to migrate or otherwise image the VSP survey from which it was calculated, i.e., the VSP survey will be used to "self-image."

Further, in the preferred arrangement a weight function will be calculated from the VSP survey that is used in conjunction with the migration algorithm to correct for amplitude and illumination effects.

Finally, and by way of summary, note that the instant invention differs from a standard migration in at least one important aspect: the Green's functions and weights that are used to image the surface seismic data are field measurements of the Green's functions obtained from VSP or similar data. Except for this aspect, in the preferred embodiment the instant method utilizes a standard Kirchhoff migration to migrate 2D or 3D seismic data where the data are cross-correlated with Green's functions to construct an image of the subsurface structure. The Kirchhoff migration algorithm is preferably expressed in its most general form, rather than in a form that adopts the typical industry practice of equating Kirchhoff to imaging with high-frequency asymptotic single arrival Green's function.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
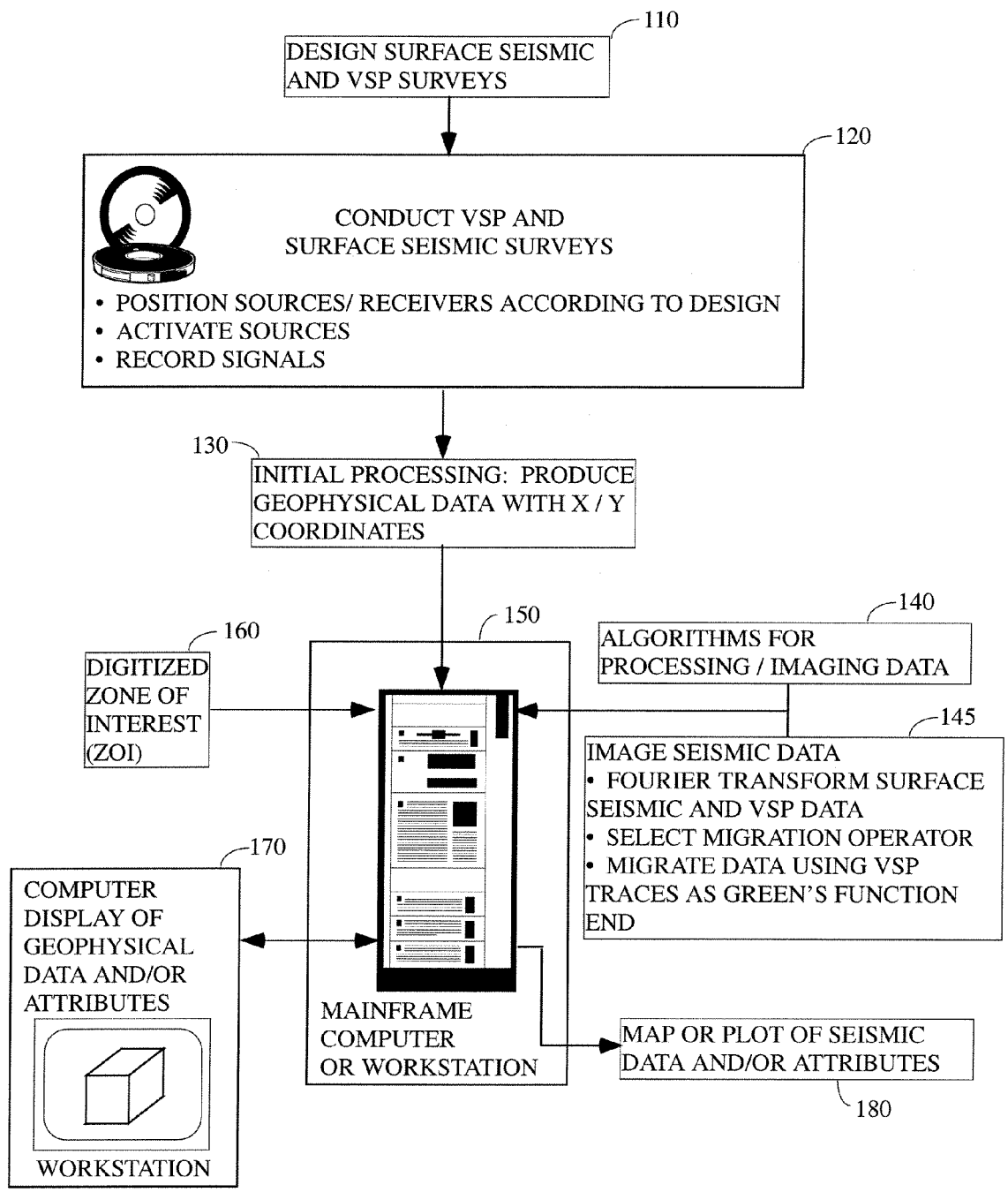
FIG. 1 illustrates the general environment of the instant invention

While this invention is susceptible of being embodied in many different forms, there is shown in the drawings, and will herein be described, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. As a first step, a seismic survey will be designed (step 110), wherein the survey geometry, sample rate, number of sources/receivers, etc. would typically be selected in order to image a preferred subsurface target. Among the many parameters that might be considered in formulating the survey design are:

the surface area to be covered by the survey;
whether the survey will be conducted on land, offshore, or some combination of the two environments;

the depth of the target;

the 3-D structure of the target (including its 2-D or 3-D dip, if any);

whether the design will utilize an "end on" configuration (wherein all of the active receivers are on the same side of the source) or a "split spread" configuration (i.e., wherein active receivers are placed both ahead of and behind of the source);

the maximum offset (i.e., in the case where an active source is used the distance from the source to the most distant active receiver) and minimum offset (i.e., the distance from the source to the closest active receiver);

the receiver-to-receiver spacing;

the source-point spacing if a controlled source is used (i.e., the shot-to-shot spacing, where "shot" is used in the sense of "source activation point");

the relation between source-points and receiver-points (e.g., sources near to receivers, sources midway between receivers, etc.);

the frequencies expected in the received data;

the strength of the sources, and the sensitivity of the receivers, etc.

Of course, the selection of parameters such as the foregoing are design choices that are well within capability of one of ordinary skill in the art. Further, those of ordinary skill in the art will recognize that many of the previous parameters are interrelated (e.g., specification of the target depth determines in a general way a preferred maximum offset, etc.).

Note that, in one preferred embodiment of the instant invention, two surveys will be planned: a VSP survey and a conventional 2D or 3D survey. Of course, the actual surveys may be taken at different times even, for example, years apart. For example, in some cases a 2D or 3D seismic survey might be conducted adjacent to, proximate to, around, etc., a preexisting VSP survey, the idea being that the existing VSP data will be used to assist in the processing of the newly acquired data. Obviously, the opposite approach could also be taken, i.e., a VSP survey or similar survey could be conducted in a well that has been drilled in the vicinity of a pre-existing 2D or 3D survey, with the thought that the previously acquired data might benefit from reprocessing according to the method disclosed herein. Finally, the VSP and the 2D or 3D survey could also be obtained at the same time.

Next, equipment (including geophones and/or hydrophones or other seismic receivers, as well as recording instruments, etc.) will be typically moved to and set up in the field at least approximately according to the planned survey design 110. Next, and as is described more fully below, a survey will be conducted 120 that is preferably at least approximately in accordance with the original design. Of course, it is certainly possible that on-site changes will need to be made to the survey as-designed. However, generally speaking the goal of the field crew is to replicate the parameters of the original survey parameter specifications as closely as is possible.

Additionally, it should be noted that preferably the receivers will be some combination of surface (including land and/or marine) receivers and one or more downhole receivers. Methods for emplacing either temporarily or permanently sea bottom and downhole receivers are well known to those of ordinary skill in the art and will not be discussed further here.

After positioning the source and receivers, the data for each survey will preferably be collected conventionally depending on the sort of survey that is being taken. For example, if a controlled source survey is conducted each source activation might be accompanied by 8 seconds or so of recording at a 2 ms sample interval, with the exact length of each recording and sample rate being depending on a number of factors well known to those of ordinary skill in the art. On the other hand, if the survey is a passive one, the recording will preferably be continuous or nearly so, with the data possibly broken up into convenient individual records, the length of which typically may be 30 s or more.

As is typical in controlled source seismic surveys, the source will be activated and the resulting seismic signals sensed by the receivers and converted to electrical energy which is subsequently digitized and recorded. The response of each receiver to the source will preferably be captured digitally as a function of time and stored on magnetic or other media for transportation to a centralized computing facility where the data will be processed, interpreted, and integrated into other data taken over the same prospect. That being said, in some instances some amount of initial processing 130 will be applied to the data while it is in the field. For example, such in-field processing might be done in order to verify the quality of the data that are being collected. In other instances, the data might be processed to see whether or not the target subsurface rock units are being imaged adequately. In any case, after field processing the data will usually at least be relatable to specific locations on the surface of the earth.

In a passive source survey, a similar procedure takes place although there is no controlled activation of the source. Instead, the sources of seismic energy occur naturally at random times and at much lower amplitude than a conventional controlled source. This may help explain while longer recording periods are more often used when passive source data is collected.

Although the data that are collected according to the instant invention may be processed to some extent in the field (step 130), eventually it will typically be transferred to a processing center where more computing resources 150 and algorithms 140 are available. In the processing center a variety of processes 140 might be applied to the data to make them ready for use by the explorationist. At some point the processed data traces will likely be stored, by way of example only, on hard disk, magnetic tape, magneto-optical disk, DVD disk, or other mass storage means.

Note that a general purpose computer 150 would typically include, in addition to mainframes and workstations, computers and networks of computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program. In the case of a 3-D geophysical data, the zone of interest 160 would typically include specifics as to the lateral extent and thickness (which might be variable and could be measured in time, depth, frequency, etc.) of a subsurface interval. The exact means by which such zones are created, picked, digitized, stored, and later read during program execution is unimportant to the instant invention and those skilled in the art will recognize that this might be done any number of ways.

The algorithms that are used to process the seismic data might be conveyed into the computer 150 by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

Similarly, algorithms to implement a preferred embodiment of the instant invention 145 will preferably be loaded into the computer 150 by any conventional or unconventional means of conveying computer source or object code.

After the seismic data have been subjected to the processes discussed herein, the resulting information will likely be displayed either on a high-resolution color computer monitor 170 or in hard-copy form as a printed section or a map 180. The geophysical interpreter would then use the displayed images to assist him or her in identifying subsurface features conducive to the generation, migration, or accumulation of hydrocarbons.

PREFERRED EMBODIMENTS

According to a first preferred embodiment, there is provided a system and method for imaging the subsurface which utilizes a combination of surface receivers and receivers situated in the subsurface to provide a better subsurface image than has heretofore been possible. In more particular and by way of summary, the methods described herein are conceptually very similar to classical migration/imaging for surface seismic data. However, instead of using computed (estimated) Green's functions in the imaging process, the instant invention utilizes measured (or empirical) Green's functions from VSP data to image the surface seismic data. Additionally, the migration will be further enhanced through the use of a weight function that is calculated from the VSP data and is designed to correct for amplitude and imaging effects, thereby producing an output that is more nearly true-amplitude. Although the theory discussed herein is most appropriate where the input subsurface model is stratified media with a v(z) velocity profile, but is also appropriate in situations where there are lateral velocity variations, preferably mild ones.

According to another preferred embodiment, there is a provided a method substantially as described above but wherein the calculated Green's function is used to migrate or otherwise image the VSP data from which it was calculated, thereby creating a self-imaged dataset without having to first estimate a velocity model as would conventionally be necessary. The measurements from the VSP can also be used as a tool for calibrating computed Green's functions and migration operators as well as amplitude/imaging correcting weight functions.

Turning now to a detailed discussion of the instant invention, seismic migration is a process where wavefields recorded on or near the surface are mapped back into the sub-surface to form an image of the sub-surface geology (structure). Common to current migration methods is that they rely on a computational model for the subsurface, so that approximate Green's functions can be constructed between all surface (recording) locations and all image points in the sub-surface. The accuracy and complexity of this computational model will determine the image fidelity it is possible to achieve. Most state-of-the-art migration methods will use Green's functions that include multiple arrivals and some finite-frequency effects, allowing them to image fairly complex geological structures. However, the computational model is, in most cases, only represented as a scalar wave speed (velocity) with smooth spatial variations. Some models will also include certain discontinuities in the velocity in an effort to represent geological boundaries that separate regions with different velocity. Whatever the model is, it has to be derived from measurements, and it will at best be a non-unique solution to an inverse problem. Commonly, much more crude approximations are used, say that only try to match the predicted first-arrivals to the observed first arrivals in the data.

However, the instant inventors have observed that the measured data from a VSP survey provide a source from which Green's functions that intrinsically account for all propagation effects that the source signal experienced while traveling through the earth can be estimated. In terms of how such a function would normally be described, the measured signal from the VSP will be one that includes all arrivals and the kinematic and dynamic effects from anisotropy and absorption in the subsurface.

The parameter estimation process for these more complex physical models of the subsurface is even more challenging than the single (velocity) parameter process. It is both tedious and difficult to estimate the correct parameters, and it can seldom be done to a satisfactory accuracy. Since many hydrocarbon reservoirs are located beneath overburdens composed of anisotropic rocks, it is anticipated that the instant invention will be particularly useful in imaging such reservoirs.

By use of the methods discussed hereinafter, data from a VSP can provide Green's functions that intrinsically include all propagation effects that the source signal experienced while traveling through the earth. In terms of how such a function would normally be described, the measured signal from the VSP will be one that includes all arrivals and the kinematic and dynamic effects from anisotropy and absorption in the subsurface.

It should be noted that the methods taught herein differ from conventional migration in two important ways. First, the Green's functions that are used to image the surface seismic data are based on field measurements of the Green's functions as obtained from VSP data. Except for this, the migration algorithm that is used is preferably a standard Kirchhoff or other migration, where the data are cross-correlated with Green's functions to construct an image of the subsurface structure. Kirchhoff migration is preferably used in its most general form, rather than the typical case where Kirchhoff is equated to imaging with high-frequency asymptotic single arrival Green's functions. A second aspect of the instant invention that is different from that which has been taught heretofore is the use of an amplitude compensation or other weighting function in the migration, wherein the weighting function is calculated from the VSP data.

Without loss of generality, for purposes of specificity in the text that follows, an image I(x) point x in the subsurface (where x is one, two, three, etc., dimensional as needed) can be written according to the instant invention as follows:

$$I(x) = \iiint_{S \times R \times \Omega} G(x|x_S, \omega) G^*(x|x_R, \omega) D(x_S, x_R, \omega) dx_S dx_R d\omega.$$

where $G(x|x_s)$ and $G(x|x_r)$ are the Green's functions (i.e., VSP data traces) from the image point x to a source point $x_s$ and receiver point $x_r$ on the surface respectively, and where $D(x_S, x_R, \omega)$ is the Fourier transformed data trace, plane, volume, etc. The data trace $D(x_S, x_R, \omega)$ is preferably taken for the same source receiver, and the image is given as a triple integral over all sources, receivers and temporal frequency. In the above form, the Kirchhoff integral (assuming that a Kirchhoff migration has been utilized) is only kinematically correct. Hence, with accurate Green's functions the reflectors will be imaged in their spatially correct location, but have incorrect amplitude. The instant inventors, though, have found an improvement to the prior art which corrects for this problem.

According to a preferred aspect of the instant invention, a true-amplitude version of the instant VSP-based Green's function migration can be derived for, for example, a Kirchhoff migration, by modifying the previous equation to introduce an amplitude compensation/weighting term w(x) of the general form:

$$I_w(x) = w(x) \iiint_{S \times R \times \Omega} G(x|x_S, \omega) G(x|x_R, \omega) D(x_S, x_R, \omega) dx_S dx_R d\omega.$$

In one preferred embodiment, the weight function will be chosen to be the cross-correlation of all Green's functions for a given image point, e.g., $$w(x) = \frac{1}{\iiint_{SxRx\Omega} G(x|x_S, \omega)G(x|x_R, \omega)dx_S dx_R d\omega}$$

so that the equation for $I_w(x)$, the migrated image point in the subsurface at point x, becomes:

$$I_w(x) = \frac{\iiint_{SxRx\Omega} G(x|x_S, \omega)G(x|x_R, \omega)D(x_S, x_R, \omega)dx_S dx_R d\omega}{\iiint_{SxRx\Omega} G(x|x_S, \omega)G(x|x_R, \omega)dx_S dx_R d\omega}.$$

Note that under the preferred subsurface model (homogeneous or horizontally stratified) the Green's function for any subsurface point x may be readily obtained by conceptually "sliding" the well in which the VSP was conducted and its data traces over to a point on the earth's surface above x (e.g., to the point (x,y,0) if the subsurface point x=(x,y,z)). This makes it relatively easy to select $G(x|x_s)$ and $G(x|x_r)$ from among the VSP traces within the survey. Obviously, in some cases interpolation may be necessary in order to form the Green's function for a given subsurface point and those of ordinary skill in the art will understand how this can be done.

Figure 2:
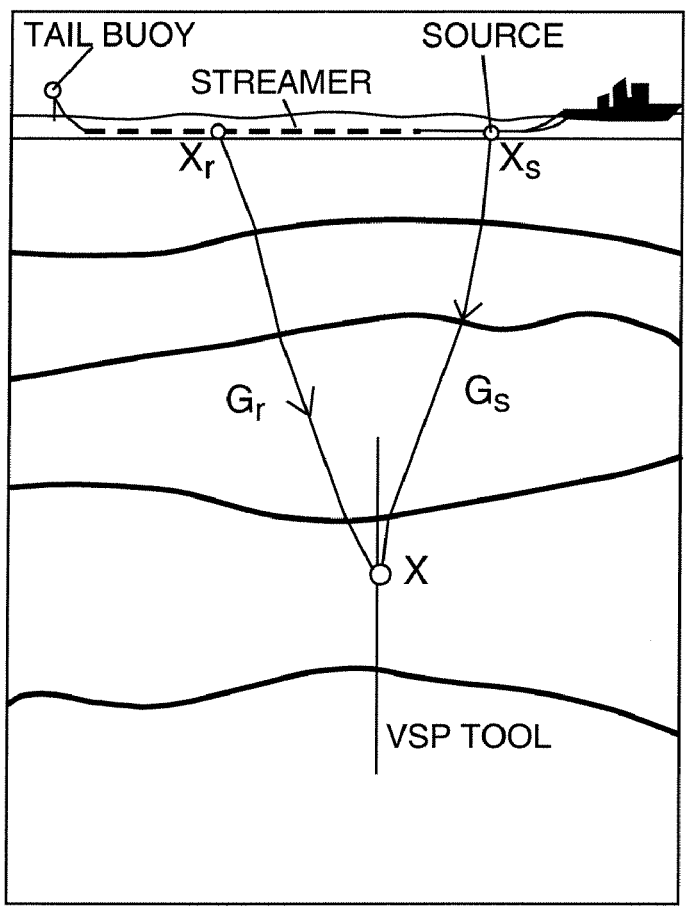
FIG. 2 contains a schematic illustration of how VSP data provide natural Green's functions for surface seismic data for an image-point located at x.

As generally illustrated in FIG. 2, a VSP can be used to obtain a measured (or, "true" in noise-free cases) transfer function between a surface location $x_s$ and a sub-surface point x located at a receiver along the VSP array. More specifically, this figure helps illustrate how VSP data provide natural Green's functions estimates for surface seismic data at an image-point located at x. Although a marine survey case is illustrated in this figure, those of ordinary skill in the art will recognize that the same general concepts apply to land data.

When the survey is taken on land the source will be assumed to be impulsive and, if so, the measurement as illustrated in FIG. 2 is equivalent to the Green's functions between the two points $x_s$ and x. As a consequence, a VSP survey can then provide Green's functions estimates from all source locations to all down-hole receiver locations. When the subsurface is laterally invariant, a measurement at a given depth is valid for all lateral positions (shift invariance) and a complete spatial image can be constructed for the depth-interval spanned by the VSP tool or multiple VSP tool settings using the equation set out above. Regardless of the velocity distribution, a VSP can always be used to image the surface seismic in the location of the VSP, hence providing a tool to calibrate migration operators. However, when the subsurface is laterally invariant or smoothly varying, the measured Green's functions can also be used to image the surface seismic data accurately in locations away from the wellbore, with an obvious risk of inaccuracy depending on the nature of the surrounding rock units.

Of course, the instant method would be more useful when used to assist in the migration or other imaging of seismic data that are some distance away from the wellbore. Of interest is how far the Green's function calculated at a well can be utilized away from it without seriously degrading the migration results obtained thereby. In the case the subsurface is laterally invariant or smoothly varying, a single one-sided walk-away VSP could potentially provide sufficient measurements to construct all of the Green's functions that would be necessary to migrate the data. This model (i.e., a v(z) velocity model) does however assume radial symmetry, and is a best-case scenario. A 3D VSP will provide a better dataset for use with the instant invention, as it includes coverage for all azimuths and offsets.

Of course, the VSP and surface seismic do not need to be acquired simultaneously. The surface (source) locations for the VSP will preferably be sufficiently dense so that all mid-points and offsets in the surface data are covered. Well known interpolation techniques similar to those used in conventional Kirchhoff migration can be used to construct Green's functions for source locations in-between true surface locations and image points between the receiver locations along the well.

When the subsurface is laterally invariant, a measurement at a given depth is valid for all lateral positions (shift invariance) and a complete spatial image can be constructed for the depth-interval spanned by the VSP tool. A large depth interval can also be achieved by multiple VSP tool settings and repeated source excitations. If the subsurface is smoothly varying, the measured Green's functions can also be used to image the surface seismic data accurately in locations away from the well-bore. Further, if VSPs from multiple wells are available, it is possible to use standard techniques from Kirchhoff migration to construct Green's functions from locations in-between the wells and use these as virtual wells to supply Green's functions for our migration scheme.

Figure 3:
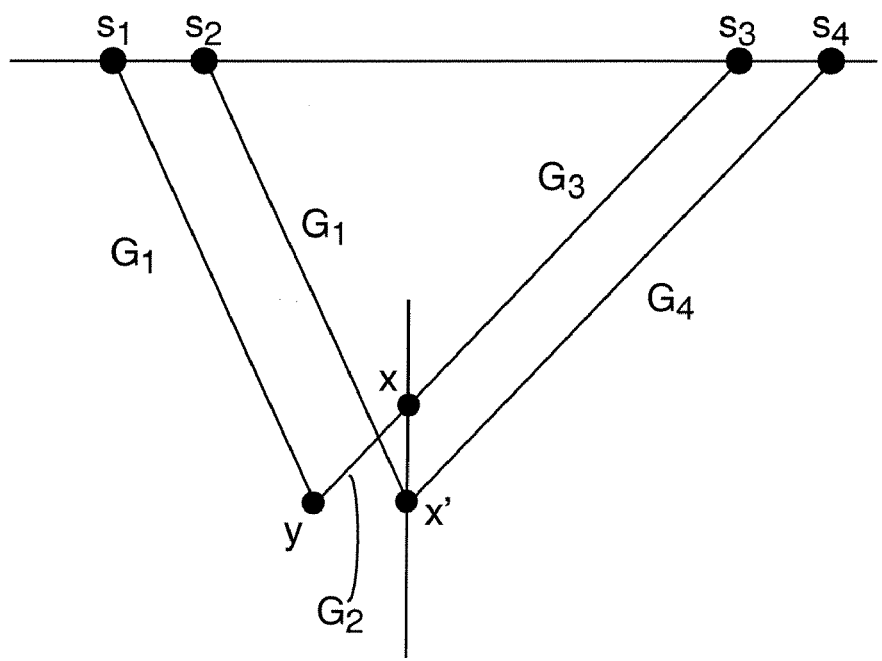
FIG. 3 illustrates how VSP data can be self-imaging without a need to determine a velocity model, assuming a laterally invariant subsurface.

Turning to another aspect of the instant invention and is generally indicated in FIG. 3, according to another preferred embodiment a VSP survey can be made to be "self-imaging" by using Green's functions calculated therefrom to migrate that same dataset (i.e., VSP data traces will be used to populate both G(•) and D(•) in the previous equations). The self-imaging does not, as the name indicates, involve any surface data aside from the VSP traces themselves. The Green's functions for imaging are derived from the VSP data as above with the one change, i.e., that the 'receiver' side Green's function is modified by a cross-correlation before it is applied in the final imaging. As shown in FIG. 3, the image at an image point y is preferably formed by the cross-correlation of the two Green's functions $G_1$ and $G_2$, where $G_2$ is constructed by cross-correlating $G_3$ with $G_4$, both of which are measured by the VSP tool. Typically $G_2$ will not measured directly, but instead it will be synthesized from two other measurements. The construct in FIG. 3 assumes a homogeneous medium, but it also holds for laterally invariant media. The instant method is also applicable to more complex subsurface models (e.g., velocity models that vary laterally and/or in depth), but the results will likely be best in where the model is at least approximately horizontally varying.

As is shown in FIG. 2, the image at an image point y is formed by the cross-correlation of the two Green's functions $G_1$ and $G_2$, where $G_2$ is constructed by cross-correlating $G_3$ with $G_4$, both of which are measured by the VSP tool. $G_2$ is not measured directly, but is instead preferably synthesized from two other measurements. The construct in FIG. 2 assumes a homogeneous medium, but it also holds for lateral invariant media. By way of further explanation, if $G_1=G(T_1)$, $G_2=G(T_2)$, etc., where $T_1$ is the travel time from source 1 in FIG. 2, then $T_1$=the travel time as measured from VSP data, $$T_2=T_4-T_3,$$

$T_3$=the travel time as measured from VSP data,
$T_4$=the travel time measured from VSP data,
it follows that, with respect to example of FIG. 2, $$I(x) = \iiint_{S \times R \times \Omega} \underbrace{G_1(x \mid x_s; \omega)}_{VSP} \underbrace{G_4(x_r \mid x; \omega)}_{VSP} \underbrace{G_3^*(x_r \mid x; \omega)}_{VSP} D(x_s, x_r; \omega) dx_s dx_r d\omega$$

where, as before, x=(x,y,z) is a point in the subsurface.

The instant technique can, given a v(z) assumption, be used to make any standard VSP imaging schemes such as multiple imaging into velocity model independent processes with all the above-mentioned benefits.

The VSP self imaging technique taught herein can be used on data from both impulsive sources, e.g. dynamite or airgun, and frequency sweep sources such as Vibroseis®. Using the measured Green's functions in the particular sequence described above (since it utilizes cross-correlation), there will be no need to de-convolve the source signal from the data. This will be of particular importance when dealing with Vibroseis® data, where a separate source deconvolution is normally applied at the onset of processing. Here, this step is carried out as part of the imaging.

Figure 4:
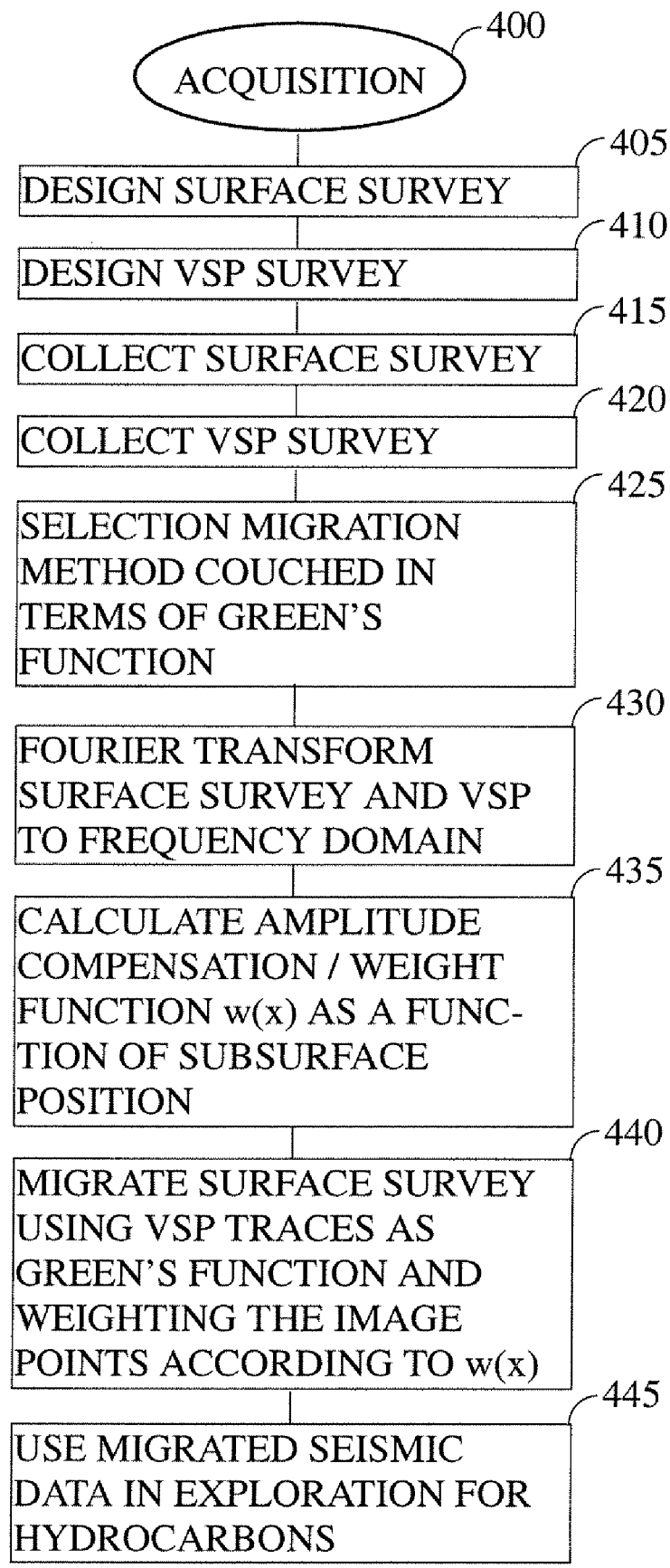
FIG. 4 illustrates a preferred a preferred operating logic of the instant invention.

Finally, and turning to FIG. 4, wherein is contained a preferred operating logic suitable for use with the instant invention, as first preferred steps 405 and 410 a surface survey and a VSP survey will be designed. Note that in the event that the VSP is to be self-imaged as has been discussed previously, a conventional surface (marine or land) survey would not be needed.

As next preferred steps 415 and 420, the surface survey and VSP surveys will be collected according to methods well known to those of ordinary skill in the art. Note, as has been discussed previously, the surveys need not be collected at the same time or even in close proximity time-wise. However, for best results the surface survey should be located proximate to the well in which the VSP was collected. Further, and as has been mentioned previously, the migration results will likely be superior if the image points are kept within the vertical range of the VSP.

After the survey data (both VSP and surface) are collected, the data will preferably be processed according to methods well known to those of ordinary skill in the art by, for example, application of seismic processing algorithms such as determination of geometry information for each trace, application of statics corrections (if appropriate), filtering, bad trace removal, deconvolution, gain recovery, mute, etc.

As a next preferred step 425, a migration algorithm will be selected. In one preferred embodiment, and as has been discussed previously, the migration method will be Kirchhoff. However, that is only a preferred migration method and any other method (whether in time or depth) which can be somehow be couched in terms of a Green's function could be used in the alternative (e.g., F-K migration, downward continuation, etc.).

As a next preferred step, a time-direction Fourier transform will be computed for the surface and VSP seismic traces (step 430), i.e., all traces will be transformed to the frequency domain. Note that is not strictly required, although it is preferred for purposes of computational efficiency (e.g., time-domain convolution becomes frequency domain multiplication as is well known to those of ordinary skill in the art).

As a next preferred step, the weight function w(x) will be calculated from the VSP traces (or processed versions thereof) according to the equation presented previously (step 435). Note that because of the way that w(x) has been defined, it is possible to precompute the weight function (to include precomputing a 3D volume of weighting points) which obviously will increase the efficiency of the instant method. Additionally, it should be noted that although it is desirable that the VSP traces that are used to migrate will be the same ones as those from which the weight function is calculated, that is not strictly required.

Note that a dip-consistent correction for receiver depth can readily be implemented in connection with the instant invention. Preferably, geologic dip is compensated for using simple trigonometric calculations. In one preferred arrangement, if the geological dip is denoted by $\alpha$, the correction to the Green's function lookup is given by $\Delta z = \Delta x \operatorname{Tan}(\alpha)$, where $\Delta x$ is the distance from the wellbore to the image point. Thus, as the image point moves away from the well in the up-dip direction, shallower receivers will tend to be used. That being said, note that this correction is optional and a purely data-driven migration might be used instead. However, incorporating additional information (such as velocity, dip, etc.) is likely to improve the seismic image that results.

Next, the surface survey will preferably be migrated (or the VSP survey will be self migrated) using the recorded and transformed traces as Green's functions in the migration equation (step 440) and, preferably, using the weight function calculated previously. As is conventionally done, preferably each image point in the migrated output will be formed from a surface-to-image point Green's function (i.e., a "shot" Green's function) and an image point-to-surface Green's function (i.e., a "receiver" Green's function). In the event that the subsurface geology around the VSP well is radially symmetric (or approximately so), the shot and receiver Green's function will be the same, i.e., only a single Green's function would actually be needed for the migration. Finally, and as is indicated in step 440, the Kirchhoff or other migration algorithm will be modified by introducing a weight function w(x) as has been discussed previously.

Those of ordinary skill in the art will recognize that, although Kirchhoff migration is the preferred method of applying the instant invention to seismic data, virtually any migration method might be used. All that is required is that the migration operator be expressible in terms of some form of Green's function.

Finally, the migrated seismic data will preferably be used in the exploration for hydrocarbons or other subsurface resources within the earth's surface (step 445). Of course, the output from step 440 might be processed further after migration (e.g., attribute generation, etc.) before being utilized as an exploration tool. Those of ordinary skill in the art will understand how such additional processing might be useful in some contexts.

By way of summary, the instant method utilizes measured Green's functions as provided by seismic traces from a VSP survey to migrate either another seismic dataset, or itself (self-imaged). Note that, in the prior art, such Green's functions are calculated based on subsurface models that are provided as input to the migration program, such models being subject to error from numerous sources. Although the instant methods are most likely to be useful in the case where the subsurface velocity model is constant or horizontally stratified, deviations from this model need not prevent application of the instant invention, as the instant invention is relatively robust to departures from the ideal subsurface configuration. Additionally, one mechanism for correcting for subsurface dip has been discussed herein. Those of ordinary skill in the art will likely be able to develop others.

It should be noted that although the phrase "surface survey" has been utilized herein to identify preferred embodiments, that term should be broadly construed to include land surveys wherein the source and receivers are located on the earth's surface, as well as marine surveys where the source/receivers are towed beneath the surface of the water, as well as marine surveys where the source is towed and the receivers are positioned on the bottom of the body of water (e.g., ocean bottom surveys), as well as land surveys where the sources or receivers are positioned at some predetermined depth, etc. Further, in some instances (e.g., self-imaged VSP surveys) no surface survey needs to be conducted.

Further, although the preferred use of the instant invention is with actual seismic field data, it would also be suitable for work with model-generated data (e.g., synthetic data) substituted for either the surface survey or the VSP survey.

Although the methods discussed herein have primarily been discussed in context of the location of hydrocarbon deposits in the subsurface, those of ordinary skill in the art will recognize that the instant methods could readily be applied to the location of other subsurface resources (e.g., $CO_2$ deposits, minerals, etc.). As a consequence, when the term "subsurface resource" is used in the claims below, that term should be broadly interpreted to include hydrocarbon deposits as well as non-hydrocarbon deposits.

Note also that in those instances where a VSP or a seismic trace are utilized by the instant invention it is certainly possible that some amount of preprocessing has been applied to such traces before inclusion into the migration operation, including operations such as filtering, despiking, muting, transformation via Fourier Transform (or other transformation), etc. As a consequence, trace data should be broadly construed to include traces to which significant preprocessing has potentially been applied.

Finally, note that a VSP survey is a "seismic survey" as that term is used in the instant disclosure. As such, those instances in the claims where a "seismic survey" is called for, a VSP survey could also be used. More specifically, it has previously been shown that a VSP survey can be self-imaging according to the instant methods, i.e., no separate seismic survey need be collected. In this case, the VSP traces function both as Green's functions for the migration and as the object of the migration, i.e., D(•) presented previously. As a consequence, when a VSP survey and a seismic survey are called for in a claim, it should be understood that the two surveys might very well be the same single survey, with the VSP filling both roles.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration, comprising the steps of:
   (a) collecting a seismic survey proximate to a subsurface exploration target, said seismic survey comprising a plurality of seismic traces imaging at least a portion of said subsurface exploration target;
   (b) collecting at least one VSP data trace from a well proximate to said seismic survey;
   (c) selecting one or more migration VSP data traces from said at least one VSP data traces;
   (d) selecting one or more weight VSP data traces from said at least one VSP data trace;
   (e) calculating a weight function from said selected one or more weight VSP traces;
   (f) forming at least one Green's function from said one or more migration VSP data traces;
   (g) migrating at least a portion of said plurality of seismic traces using said weight function and said at least one Green's function, thereby producing a migrated seismic dataset; and,
   (h) using at least a portion of said migrated seismic dataset to explore for subsurface resources within said subsurface exploration target.

2. A method according to claim 1, wherein step (f) comprises the step of:
   (f1) filtering each of said one or more migration VSP traces, thereby producing a same number of filtered migration VSP data traces, and,
   (f2) forming at least one Green's function from said one or more filtered migration VSP data traces.

3. A method according to claim 1, wherein said one or more migration VSP traces and said one or more weight VSP traces are a same traces.

4. A method according to claim 1, wherein step (e) comprises the step of:
   (e1) calculating a weight function from said selected one or more weight VSP traces, wherein said weight function is calculated according to the equation:

$$w(x) = \frac{1}{\iiint_{SxRx\Omega} G(x|x_S, \omega)G(x|x_R, \omega)dx_S dx_R d\omega}$$

where, $G(x|x_S,\omega)$ is a Green's function from an image point to a source, $G(x|x_R,\omega))$ is a Green's function from an image point to a receiver, $\omega$ is a frequency, and the integration is taken over all sources S, all receivers R, and all frequencies $\Omega$.

5. A method according to claim 1, wherein step (f) comprises the step of:
   (f1) forming at least one Green's function from said one or more migration VSP data traces by choosing each of said at least one Green's functions to be identically equal to one of said one or more migration VSP data traces.

6. A method according to claim 1, wherein said at least one VSP data trace comprises said plurality of seismic traces.

7. A method according to claim 1, wherein step (f) comprises the step of:
   (f1) forming a plurality of Green's functions from said one or more migration VSP data traces,
   and wherein step (g) comprises the step of
   (g1) migrating at least a portion of said plurality of seismic traces using said weight function and said plurality of Green's functions according to the equation $$I_w(x) = \frac{\iiint_{SxRx\Omega} G(x|x_S, \omega)G(x|x_R, \omega)D(x_S, x_R, \omega)dx_S dx_R d\omega}{\iiint_{SxRx\Omega} G(x|x_S, \omega)G(x|x_R, \omega)dx_S dx_R d\omega}$$

thereby producing a migrated seismic dataset,
where $I_w(x)$ is a migrated point within said migrated seismic dataset,
where $G(x|x_S,\omega)$ is a Green's function from an image point to a source,
where $G(x|x_R,\omega)$ is a Green's function from an image point to a receiver,
where $D(x_S,x_R,\omega)$ is a Fourier transformed seismic trace,
where $\omega$ is a frequency, and
where the integration is taken over all sources S, all receivers R, and all frequencies $\Omega$.

8. A method of seismic exploration, comprising the steps of:
- (a) collecting a seismic survey proximate to a subsurface exploration target, said seismic survey comprising a plurality of seismic traces imaging at least a portion of said subsurface exploration target;
- (b) collecting at least one VSP data trace from a well proximate to said seismic survey;
- (c) selecting one or more of said VSP data traces, thereby selecting one or more migration VSP traces;
- (d) selecting one or more of said VSP data traces, thereby selecting one or more weight VSP traces;
- (e) calculating a weight function from said selected one or more weight VSP traces;
- (f) selecting a subsurface image point;
- (g) using at least a portion of said at least one migration VSP data traces to obtain at least one shot Green's function;
- (h) using at least a portion of said at least one migration VSP data traces to obtain at least one receiver Green's function;
- (i) forming a migrated image point at said subsurface image point using at least said at least one shot Green's function, said at least one receiver Green's function, at least a portion of said seismic survey, and at least a portion of said weight function;
- (j) performing at least steps (c) through (j) at least a plurality of times, thereby producing a plurality of migrated image points; and,
- (k) using at least a portion of said plurality of migrated image points to explore for subsurface resources within said subsurface exploration target.

9. A method according to claim 8, wherein step (g) comprises the steps of:
- (g1) filtering each of said at least one migration VSP data traces, thereby obtaining at least one filtered VSP data trace, and,
- (g2) using at least a portion of said at least one filtered VSP data traces to obtain at least one shot Green's function;

and, wherein step (h) comprises the steps of:
- (h1) filtering each of said at least one migration VSP data traces, thereby obtaining at least one filtered VSP data trace, and,
- (h2) using at least a portion of said at least one filtered VSP data traces to obtain at least one receiver Green's function.

10. A method according to claim 1, wherein said one or more migration VSP traces and said one or more weight VSP traces are a same traces.

11. A method according to claim 8, wherein step (e) comprises the step of:
- (e1) calculating a weight function from said selected one or more weight VSP traces, wherein said weight function is calculated according to the equation:

$$w(x) = \frac{1}{\iiint_{S \times R \times \Omega} G(x|x_S, \omega) G(x|x_R, \omega) dx_S dx_R d\omega}$$

where, $G(x|x_S,\omega)$ is a selected one of said at least one shot Green's function, $G(x|x_R,\omega)$ is a selected one of said at least one receiver Green's function, $\omega$ is frequency, and the integration is taken over all sources S, all receivers R, and all frequencies $\Omega$.

12. A method according to claim 8, wherein step (g) comprises the steps of:
- (g1) filtering said one or more migration VSP data traces, thereby producing a same number of filtered VSP traces, and,
- (f2) using at least a portion of said filtered VSP traces to obtain a shot Green's function, and, wherein step (h) comprises the step of:
- (h1) using at least a portion of said filtered VSP traces to obtain a receiver Green's function.

13. A method according to claim 8, wherein step (i) comprises the step of:
- (i) migrating at least a portion of said plurality of seismic traces using said weight function, said at least one shot Green's function, and said at least one receiver Green's function, according to the equation $$I_w(x) = \frac{\iiint_{S \times R \times \Omega} G(x|x_S, \omega) G(x|x_R, \omega) D(x_S, x_R, \omega) dx_S dx_R d\omega}{\iiint_{S \times R \times \Omega} G(x|x_S, \omega) G(x|x_R, \omega) dx_S dx_R d\omega}$$

thereby producing a migrated seismic dataset,
where $I_w(x)$ is a migrated point within said migrated seismic dataset,
where $G(x|x_S,\omega)$ is a selected one of said at least one shot Green's function,
where $G(x|x_R,\omega)$ is a selected one of said at least one receiver Green's function,
where $D(x_S,x_R,\omega)$ is a Fourier transformed seismic trace,
where $\omega$ is a frequency, and
where the integration is taken over all sources S, all receivers R, and all frequencies $\Omega$.

14. A method according to claim 8, wherein said at least one VSP data trace comprise said plurality of seismic traces.

* * * * *